(12) United States Patent
Moll et al.

(10) Patent No.: US 10,202,264 B2
(45) Date of Patent: Feb. 12, 2019

(54) CABLE WINCH

(71) Applicant: Konecranes Global Corporation, Hyvinkää (FI)

(72) Inventors: Oliver Moll, Solingen (DE); Giuliano Persico, Wetter (DE); Holger Freitag, Bochum (DE)

(73) Assignee: Konecranes Global Corporation, Hyvinkää (FI)

( * ) Notice: Subject to any disclaimer, the term of this patent is extended or adjusted under 35 U.S.C. 154(b) by 0 days.

(21) Appl. No.: 15/549,621

(22) PCT Filed: Feb. 10, 2016

(86) PCT No.: PCT/EP2016/052827
§ 371 (c)(1),
(2) Date: Aug. 8, 2017

(87) PCT Pub. No.: WO2016/128464
PCT Pub. Date: Aug. 18, 2016

(65) Prior Publication Data
US 2018/0022587 A1     Jan. 25, 2018

(30) Foreign Application Priority Data
Feb. 13, 2015 (DE) .................. 10 2015 102 140

(51) Int. Cl.
*B66D 1/28* (2006.01)
*B66D 1/48* (2006.01)
(Continued)

(52) U.S. Cl.
CPC ............... *B66D 1/28* (2013.01); *B66D 1/485* (2013.01); *B66D 1/54* (2013.01); *G01P 3/495* (2013.01)

(58) Field of Classification Search
CPC .. B66D 1/28; B66D 1/485; B66D 1/54; G01P 3/495
See application file for complete search history.

(56) References Cited

U.S. PATENT DOCUMENTS 3,536,298 A * 10/1970 Deslierres ............. B63B 21/663
                                                               114/244
4,177,973 A * 12/1979 Miller .................... B66D 1/54
                                                                188/170
(Continued)

FOREIGN PATENT DOCUMENTS

DE          3424590 A1     1/1986
DE        19749009 A1     5/1999
(Continued)

OTHER PUBLICATIONS

Preliminary Report on Patentability of the International Searching Authority in English from corresponding Patent Cooperation Treaty (PCT) Application No. PCT/EP2016/052827, completed Jul. 5, 2017.
(Continued)

*Primary Examiner* — Michael E Gallion
(74) *Attorney, Agent, or Firm* — Gardner, Linn, Burkhart & Ondersma LLP

(57) ABSTRACT

A cable winch, comprising an electric drive motor, a transmission, and a rotary indicator, where the electric drive motor is coupled to the transmission and the rotary indicator is associated with the electric drive motor and/or the transmission in such a way that the rotary indicator provides a signal for determining the rotational speed of the drive motor and/or of the transmission, with the rotary indicator being arranged between the electric drive motor and the transmission.

20 Claims, 2 Drawing Sheets

(51) Int. Cl.
*B66D 1/54* (2006.01)
*G01P 3/495* (2006.01)

(56) References Cited

U.S. PATENT DOCUMENTS

| | | | | |
|---|---|---|---|---|
| 6,811,112 | B1* | 11/2004 | Currie | B65H 54/2872 |
| | | | | 242/157.1 |
| 6,964,409 | B2 | 11/2005 | Appel et al. | |
| 6,966,545 | B2 | 11/2005 | Eising et al. | |
| 6,966,546 | B2 | 11/2005 | Winter et al. | |
| 6,988,715 | B2 | 1/2006 | Winter et al. | |
| 7,026,780 | B2 | 4/2006 | Schröder et al. | |
| 7,068,009 | B2 | 6/2006 | Freitag et al. | |
| 7,234,684 | B2 | 6/2007 | Kohlenberg et al. | |
| 7,374,126 | B2 | 5/2008 | Kohlenberg et al. | |
| 7,377,486 | B2 | 5/2008 | Winter et al. | |
| 7,970,520 | B2* | 6/2011 | Gross | B66D 1/58 |
| | | | | 212/272 |
| 8,763,992 | B2 | 7/2014 | Imbusch et al. | |
| 8,789,812 | B2 | 7/2014 | Imbusch et al. | |
| 8,789,813 | B2 | 7/2014 | Imbusch et al. | |
| 8,910,923 | B2 | 12/2014 | Moll et al. | |
| 9,016,486 | B2 | 4/2015 | Noll | |
| 9,385,523 | B2 | 7/2016 | Freitag et al. | |
| 9,643,322 | B2* | 5/2017 | Freitag | B25J 13/02 |
| 2005/0043132 | A1 | 2/2005 | Moll et al. | |
| 2005/0072965 | A1* | 4/2005 | Sanders | B66D 1/485 |
| | | | | 254/361 |
| 2012/0118208 | A1* | 5/2012 | Kim | B66C 21/00 |
| | | | | 108/20 |
| 2014/0145129 | A1* | 5/2014 | Bauder | B66D 1/46 |
| | | | | 254/275 |
| 2015/0047426 | A1* | 2/2015 | Ekholm | B66D 5/30 |
| | | | | 73/121 |
| 2016/0289054 | A1* | 10/2016 | Hiekata | B66D 1/46 |
| 2018/0175713 | A1* | 6/2018 | Fretz | H02K 7/116 |

FOREIGN PATENT DOCUMENTS

| | | |
|---|---|---|
| DE | 10339440 A1 | 4/2005 |
| EP | 0476459 A2 | 3/1992 |
| EP | 2179959 A1 | 4/2010 |
| JP | 2001103709 A | 4/2001 |
| JP | 2010200543 A | 9/2010 |

OTHER PUBLICATIONS

International Search Report and Written Opinion of the International Searching Authority from corresponding Patent Cooperation Treaty (PCT) Application No. PCT/EP2016/052827, indicated completed on Jun. 10, 2016.

International Preliminary Examination Report from corresponding Patent Cooperation Treaty (PCT) Application No. PCT/EP2016/052827, dated May 3, 2017.

* cited by examiner

CABLE WINCH

CROSS REFERENCE TO RELATED APPLICATIONS

The present application claims the priority benefits of International Patent Application No. PCT/EP2016/052827, filed Feb. 10, 2016, and claims benefit of DE 102015102140.4, filed on Feb. 13, 2015.

BACKGROUND OF THE INVENTION

The invention relates to a cable winch.

German laid-open document DE 34 24 590 A1 already discloses a chain hoist comprising an electric drive motor. The drive motor is connected by means of a transmission to a chain wheel for driving a chain. The transmission typically has a transmission input shaft, at the end of which opposite the drive motor a disk is connected for conjoint rotation therewith. The disk is a component part of a sensor arrangement for determining the rotational speed of the transmission input shaft which includes a sensor which operates according to the Hall effect. For this purpose, magnets are embedded along the circumference of the disk at mutually spaced intervals, said magnets being detected by the Hall sensor when they move past the Hall sensor by rotation of the transmission input shaft.

Furthermore, European patent application EP 0 476 459 A2 describes a safety apparatus for cranes in which a rotational speed sensor and a rotation angle sender are allocated to an electric drive motor and additionally also to a cable drum. The rotational speed sensors are designed as incremental sensors and the rotation angle senders are designed as angle encoders. Neither rotational speed sensors nor rotation angle senders are provided in the region of a transmission between the drive motor and the cable drum.

Furthermore, German patent application DE 103 39 440 A1 discloses a method of monitoring a chain hoist which evaluates a signal of a rotational speed sensor. The rotational speed sensor is arranged at one end of an input shaft of a transmission which is opposite an electric drive motor. The rotational speed sensor is designed as a light barrier which engages in a bifurcated manner around an outer edge of a serrated lock washer. The serrated lock washer is connected to the input shaft of the transmission for conjoint rotation therewith and is provided at its outer edge region with substantially rectangular teeth which are distributed uniformly along the circumference of the serrated lock washer and alternate with substantially rectangular apertures. The interruptions in the light beam caused by the teeth of the serrated lock washer moving past are evaluated as the signal.

The arrangement of a rotary encoder between a drive motor and a transmission is known from JP 2010-200 543 A in relation to the steering drive of a vehicle, and is known from DE 197 49 009 A1 in relation to the actuating drive of electric window lifts and mirror adjusters of vehicles. A corresponding arrangement is also known from JP 2001-103 709 A.

A cable winch is already known from US 2005/0072965 A1. A further cable winch comprising a rotary encoder is known from EP 2 179 959 A1.

SUMMARY OF THE INVENTION

The object of the invention is to provide a cable winch comprising an electric drive motor, a transmission and a rotary encoder, in which the rotary encoder is advantageously arranged.

In accordance with an embodiment of the invention, in the case of a cable winch comprising an electric drive motor, a transmission and a rotary encoder, wherein the electric drive motor is coupled to the transmission and the rotary encoder is allocated to the electric drive motor and/or the transmission in such a way that the rotary encoder provides a signal for determining the rotational speed of the drive motor and/or of the transmission, wherein the rotary encoder is arranged between the electric drive motor and the transmission, the rotary encoder comprises a disk and a sensor which is designed as a Hall sensor, the disk is arranged on a motor shaft of the drive motor or an input shaft of the transmission concentrically and for conjoint rotation therewith and the sensor scans the disk and is fastened to a receiver and/or the transmission, an advantageous arrangement of the rotary encoder is achieved by virtue of the fact that the disk is flat and annular, a multiplicity of windows are arranged in an edge region, which windows, being consecutive in the circumferential direction, are uniformly spaced apart from one another, the sensor scans the disk in the region of the windows, and the disk and the sensor are arranged with respect to one another such that it is possible to axially tap the signals. This permits a small construction size as seen in the radial direction.

In an advantageous manner, provision is made that the receiver is arranged on the transmission in the region of the input shaft of the transmission, the electric drive motor is fastened to the receiver, and provided within the receiver is a coupling space in which at least the functional portion of the rotary encoder is arranged. Therefore, the rotary encoder can be accommodated in a space-saving manner in an existing coupling space. The disk and the adjoining sensor are to be understood to be the functional portion of the rotary encoder. A part of the housing of the sensor can be received into a wall of the housing or the receiver.

The coupling space is also used for connecting the motor shaft of the electric drive motor to the input shaft of the transmission by means of a shaft coupling.

In this case, the coupling space is advantageously defined radially by the receiver and axially by the transmission and the electric drive motor.

In one particular structural embodiment, the receiver is annular and is oriented concentrically with respect to the input shaft of the transmission.

In a particularly advantageous manner, the coupling space is closed. The rotary encoder can thus be accommodated in such a way as to be protected against environmental influences.

An arrangement of the rotary encoder on the input shaft makes it easier to change or mount the electric drive motor.

Particularly simple assembly and maintenance are made possible by virtue of the fact that a sensor of the rotary encoder is inserted, starting from an outer side of a wall of a housing of the transmission, through a bore provided in the wall and protrudes, lying against the outer side, into the coupling space.

In a structurally simple manner, provision is also made that the rotary encoder, in particular its sensor, is arranged outside an inner space of a housing of the transmission adjoining the coupling space. Therefore, the sensor is particularly accessible from outside the housing of the transmission for maintenance and assembly purposes, without the housing or its inner space having to be opened for this purpose.

An exemplified embodiment of the invention will be explained in greater detail hereinafter with reference to an exemplified embodiment illustrated in the drawings.

DESCRIPTION OF THE PREFERRED EMBODIMENTS

Figure 1:
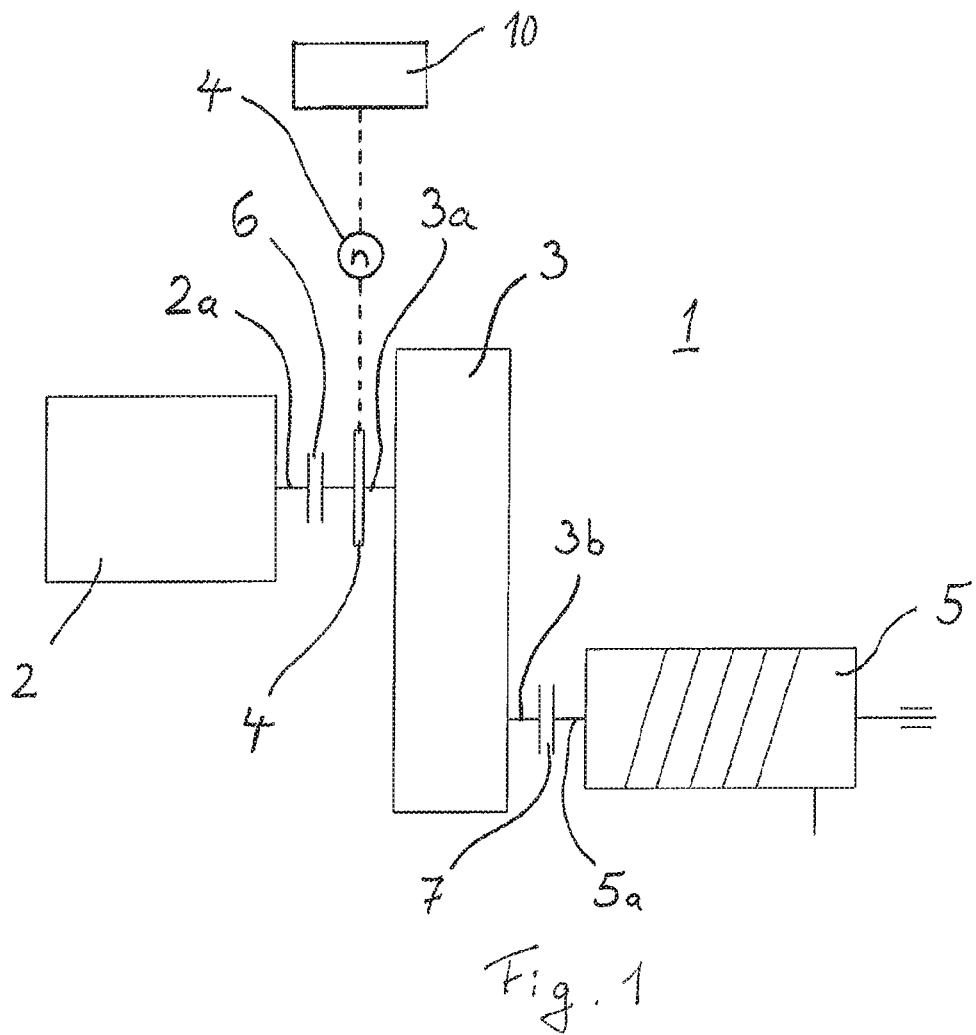
FIG. 1 shows a schematic view of the essential components of a cable winch 1.

FIG. 1 shows a schematic view of the essential components of a cable winch 1 for lifting and lowering loads, said cable winch comprising an electric drive motor 2, a transmission 3, a rotary encoder 4 and a cable drum 5. The electric drive motor 2 typically has a motor shaft 2a which protrudes on the driven-side of the drive motor 2. The motor shaft 2a is connected via a shaft coupling 6 to an input shaft 3a of the transmission 3 for conjoint rotation therewith. The input shaft 3a is allocated the rotary encoder 4, by means of which the rotational speed of the input shaft 3a can be determined. On the output-side, the transmission 3 is connected to a drum shaft 5a of the cable drum 5 via an output shaft 3b and a further coupling 7.

Figure 2:
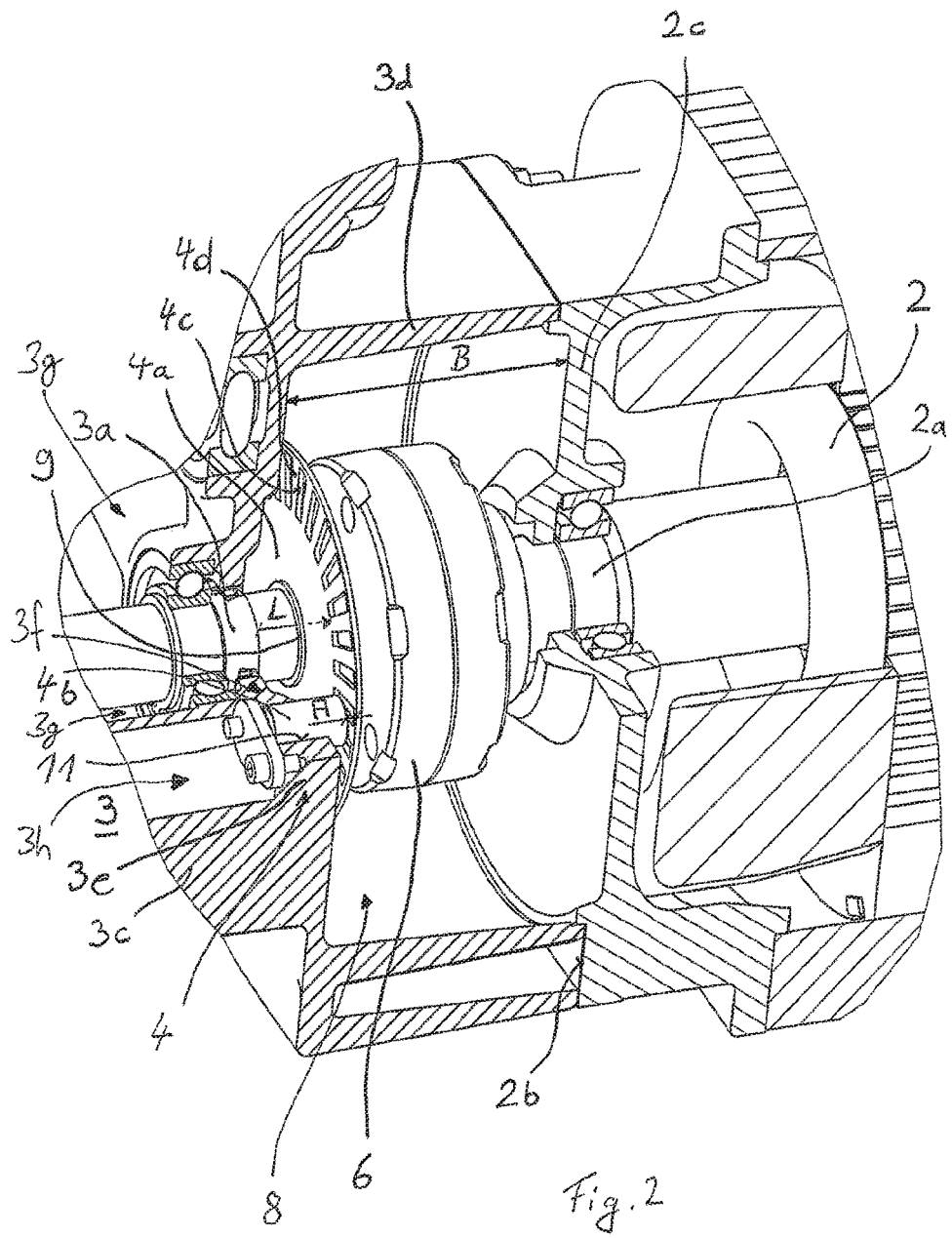
FIG. 2 shows an enlarged sectional view of the region of an electric drive motor 2 connected to a transmission 3.

FIG. 2 shows an enlarged sectional view of a driven-side part of the electric drive motor 2 and of an input-side part of the transmission 3 and of an inner space 3g of its housing 3c. The electric drive motor 2 is designed as a commercially available electric motor having a connection flange 2b with through-bores, not illustrated, for bolting to the transmission 3 which is preferably standardized. In order to mount the drive motor 2 on a housing 3c of the transmission 3, a cylindrical and sleeve-shaped receiver 3d is formed on the housing 3c, is oriented concentrically with respect to the input shaft 3a of the transmission 3 and extends outwards in parallel with the input shaft 3a. When the drive motor 2 and the transmission 3 are in the assembled state, the connection flange 2b of the drive motor 2 comes to lie against one end of the receiver 3d facing away from the housing 3c of the transmission 3 and is bolted to the receiver 3d. This produces a closed coupling space 8 which is defined radially by the receiver 3d and axially by a wall 3e of the housing 3c and a motor shaft-side plate 2c of the drive motor 2. In this case, the wall 3e and the plate 2c are spaced apart from one another correspondingly by a width B in order to form the coupling space 8. The width B is approximately 50 to 140 mm. Within the coupling space 8, the motor shaft 2a and the input shaft 3a, which is axially aligned therewith, are connected together for conjoint rotation via the shaft coupling 6. The structure of the shaft coupling 6, in particular its axial length, and the width B of the coupling space B are selected such that the input shaft 3a protrudes approximately by the length L from the wall 3e of the housing 3c and thus from the inner space 3g of the housing 3c, until the input shaft is received into the shaft coupling 6. The length L is approximately 10 to 60 mm. As a result, there is sufficient space within the coupling space 8 to receive the rotary encoder 4 which is thus arranged outside the inner space 3g adjoining the coupling space 8 and thus separately from the inner space 3g.

The rotary encoder 4 can be formed in all current embodiments. Preferably and as illustrated in FIG. 2, one embodiment of the rotary encoder 4 has a round disk 4a which is scanned in a contactless manner by a sensor 4b which operates according to the Hall effect. The disk 4a has a central opening in order to push it onto the input shaft 3a concentrically and with a small amount of clearance and to secure it with a securing ring 9 on the side facing towards the transmission 3. Provided in the bore of the disk 4a is an inwardly protruding lug which engages into a longitudinal groove in the input shaft 3a. On the opposite side, the disk 4a lies against the shaft coupling 6 e.g. via a sleeve. The disk 4a is a circular, annular and punched sheet metal part which has, in the outer edge region at a small spaced interval from the edge, a multiplicity of trapezoidal windows 4c which are equally spaced apart from one another as seen in the circumferential direction. In this case, the windows 4c are arranged distributed uniformly over the entire circumference of the disk 4a and separated from one another in each case by webs 4d consisting of the material of the disk 4a between the windows 4c. The windows 4c are likewise punched and are thus open apertures in the disk 4a. By means of a rotating input shaft 3a, the windows 4c are guided in the circumferential direction of the disk 4a past the sensor 4b and the sensor 4b detects the change between the window 4c and web 4d, which is evaluated as a counting impulse. Using this counting impulse, the rotational speed of the input shaft 3a is then calculated e.g. in revolutions per minute in a controller 10 (see FIG. 1). Preferably, thirty circumferentially consecutive windows 4c are provided and the disk has a diameter of 140 mm. Other numbers of windows instead of thirty and other diameters are also feasible.

In this case, the sensor 4b is designed as a so-called biased Hall sensor which is a fixed combination of a Hall sensor and a magnet in the sensor 4b. The windows 4c and webs 4d moving past this sensor 4b produce a different deflection of the flux lines of the magnet, which is then detected by the Hall sensor as a modulation of the flux density in terms of a counting impulse.

Furthermore, FIG. 2 shows the installation location of the sensor 4b in greater detail. As illustrated in FIG. 2, the coupling space 8 is accessible on the transmission-side from within the housing 3c via the inner space 3g and from outside the housing 3c via a bore 11. The sensor 4b is inserted through the bore 11 from outside, i.e. starting from an outer side 3h of the housing 3c, through the wall 3e of the housing 3c such that the sensor 4b is received with a part of its housing into the wall 3e. In this case, the sensor 4b, or its holding part, which is fastened to the housing 3c comes to lie against the outer side 3h, thus making said sensor easily accessible from outside the housing 3c of the transmission 3 for maintenance and assembly purposes, without the housing 3c or its inner space 3g having to be opened for this purpose. The sensor 4b protrudes, starting from the outer side 3h, through the bore 11 and protrudes from the bore 11 inwardly into the coupling space 8 and terminates at a small spaced interval A from the disk 4a to be scanned. The spaced interval A is 0.2 mm to 5 mm. The sensor 4b, owing to it being mounted away from the inner space 3g, is not in contact with the inner space 3g of the transmission 3 because the sensor 4b is arranged in a part 3f of the wall 3e which lengthens the housing 3c of the transmission 3 in order, on the one hand, to support a part of the receiver 3d and, on the other hand, to define the coupling space 8. In a corresponding manner, the receiver 3d and thus the coupling space 8 are oriented laterally offset as seen in the direction of the input shaft 3a so that, as seen in this direction, only a part of the receiver 3d covers the housing 3c of the transmission 3. A part of the receiver 3d which laterally adjoins the covered part is defined on the transmission-side by the part 3f of the wall 3e, into the bore 11 of which the sensor 4b is received, as described above.

It is also feasible to design the rotary encoder 4 having a sensor 4b as a light barrier which engages in a bifurcated manner around an outer edge of a serrated lock washer. The serrated lock washer is then connected to the input shaft 3*a* of the transmission 3 for conjoint rotation therewith and is provided at its outer edge region with substantially rectangular teeth which are distributed uniformly along the circumference of the serrated lock washer and alternate with substantially rectangular apertures. The interruptions in the light beam caused by the teeth of the serrated lock washer moving past are evaluated by the rotational speed sensor as the signal. Direct, contactless tapping of the rotational movement of the correspondingly processed, i.e. magnetized, input shaft 3*a* would also be feasible.

LIST OF REFERENCE NUMERALS

1 cable winch
2 electric drive motor
2*a* motor shaft
2*b* connection flange
2*c* plate
3 transmission
3*a* input shaft
3*b* output shaft
3*c* housing
3*d* receiver
3*e* wall
3*f* part of the wall 3*e*
3*g* inner space
3*h* outer side
4 rotary encoder
4*a* disk
4*b* sensor
4*c* window
4*d* web
5 cable drum
5*a* drum shaft
6 shaft coupling
7 further coupling
8 coupling space
9 securing ring
10 controller
11 bore
A spaced interval
B width
L length

The invention claimed is:

1. A cable winch comprising an electric drive motor, a transmission and a rotary encoder, wherein the electric drive motor is coupled to the transmission and the rotary encoder is allocated to the electric drive motor and/or the transmission such that the rotary encoder provides a signal for determining the rotational speed of the drive motor and/or of the transmission, wherein the rotary encoder is arranged between the electric drive motor and the transmission, the rotary encoder comprises a disk and a sensor which is designed as a Hall sensor, the disk is arranged on a motor shaft of the drive motor or an input shaft of the transmission concentrically and for conjoint rotation therewith and the sensor scans the disk and is fastened to a receiver and/or the transmission, and wherein the disk is flat and annular, a multiplicity of windows are arranged in an edge region, which windows, being consecutive in the circumferential direction, are uniformly spaced apart from one another, the sensor scans the disk in the region of the windows, and in that the disk and the sensor are arranged with respect to one another such that it is possible to axially tap the signals.

2. The cable winch as claimed in claim 1, wherein the receiver is arranged on the transmission in the region of the input shaft of the transmission, the electric drive motor is fastened to the receiver, and provided within the receiver is a coupling space in which at least the functional portion of the rotary encoder is arranged.

3. The cable winch as claimed in claim 2, wherein in the coupling space the motor shaft of the electric drive motor is connected to the input shaft of the transmission via a shaft coupling.

4. The cable winch as claimed in claim 2, wherein the coupling space is defined radially by the receiver and axially by the transmission and the electric drive motor.

5. The cable winch as claimed in claim 2, wherein the receiver is annular and is oriented concentrically with respect to the input shaft of the transmission.

6. The cable winch as claimed in claim 2, wherein the coupling space is closed.

7. The cable winch as claimed in claim 1, wherein the rotary encoder is arranged on the input shaft.

8. The cable winch as claimed in claim 2, wherein a sensor of the rotary encoder is inserted, starting from an outer side of a wall of a housing of the transmission, through a bore provided in the wall and protrudes, lying against the outer side, into the coupling space.

9. The cable winch as claimed in claim 2, wherein the rotary encoder, is arranged outside an inner space of a housing of the transmission adjoining the coupling space.

10. The cable winch of claim 9, wherein the sensor of the rotary encoder is arranged outside the inner space of the housing of the transmission adjoining the coupling space.

11. The cable winch of claim 3, wherein the receiver is annular and is oriented concentrically with respect to the input shaft of the transmission.

12. The cable winch of claim 4, wherein the coupling space is closed.

13. The cable winch of claim 5, wherein the coupling space is closed.

14. The cable winch of claim 2, wherein the rotary encoder is arranged on the input shaft.

15. The cable winch of claim 3, wherein the coupling space is defined radially by the receiver and axially by the transmission and the electric drive motor.

16. The cable winch of claim 15, wherein the receiver is annular and is oriented concentrically with respect to the input shaft of the transmission.

17. The cable winch of claim 16, wherein the coupling space is closed.

18. The cable winch of claim 17, wherein the rotary encoder is arranged on the input shaft.

19. The cable winch of claim 18, wherein a sensor of the rotary encoder is inserted, starting from an outer side of a wall of a housing of the transmission, through a bore provided in the wall and protrudes, lying against the outer side, into the coupling space.

20. The cable winch of claim 19, wherein the rotary encoder, is arranged outside an inner space of a housing of the transmission adjoining the coupling space.

* * * * *